United States Patent [19]
Kidder et al.

[11] Patent Number: 5,470,895
[45] Date of Patent: Nov. 28, 1995

[54] AGGLOMERATING AGENT LATEX WITH BOUND POLY(ETHYLENE OXIDE)

[75] Inventors: Kevin R. Kidder, Malta, N.Y.; Vijaya K. Kuruganti, Washington, W. Va.; Donald M. Kulich, Marietta, Ohio; John F. Graf, Vienna, W. Va.

[73] Assignee: General Electric Company, Parkersburg, W. Va.

[21] Appl. No.: 259,314

[22] Filed: Jun. 13, 1994

[51] Int. Cl.$^6$ ............................................. C08J 3/02
[52] U.S. Cl. ..................... 523/335; 525/231; 525/223; 528/491; 528/494
[58] Field of Search ...................... 523/523, 335; 525/231, 223; 528/491, 494

[56] References Cited

U.S. PATENT DOCUMENTS

| | | |
|---|---|---|
| 3,330,795 | 7/1967 | Schluter . |
| 3,892,700 | 7/1975 | Burke, Jr. . |
| 4,187,202 | 2/1980 | Kondo et al. . |
| 4,357,270 | 11/1982 | Pippa et al. . |

FOREIGN PATENT DOCUMENTS

| | | |
|---|---|---|
| 87401293 | 6/1987 | European Pat. Off. . |

OTHER PUBLICATIONS

Keppler, H. G., H. Wesslau and J. Strabenow: Agglomeration of Polymer Latices (Agglomeriation von Polymerisatlatices.) Angewandte Makromolekulare Chemie, vol. 2, pp. 1–25, 1968.

Process for the Agglomeration of Latex Particles Based on Electrolyte Sensitization, Herbert Schlueter, Chemische Werke Huels AG, Production Dept. 4, 4370 Marl, Kreis Recklinghausen, West Germany, pp. 99–114.

*Primary Examiner*—Edward Cain

[57] ABSTRACT

A process that is provided for agglomerating rubber particles of a rubbery latex. The process involves producing an agglomerating agent which is in the form of latex having particles which comprise high molecular weight polyoxyethylene bound therein. The agglomerating agent is affixed with an elastomeric latex to form agglomerated elastomeric particles. The process results in the formation of uniform size agglomerating particles, and utilizes a non-surfactant form of polyoxyethylene, which can be utilized in small amounts to yield the desired agglomerated elastomeric latex. The agglomerated particles may then be utilized as the substrate for graft copolymers, such as acrylonitrile-butadiene-styrene graft copolymers.

11 Claims, No Drawings

AGGLOMERATING AGENT LATEX WITH BOUND POLY(ETHYLENE OXIDE)

BACKGROUND OF THE INVENTION

1. Field of the Invention

The present invention relates to a process for agglomerating elastomeric latexes, and more particularly relates to a process for agglomerating elastomeric latexes involving the use of a high molecular weight polyalkylene oxide bound polymer.

2. Description of the Related Art

Use of poly(oxyethylene) surfactants either in the form of mixtures or as blocks in block copolymers are known. Specifically, U.S. Pat. No. 4,357,270 discloses agglomerating rubbery polymer latexes by mixing the rubbery latex with an alkylacrylate polymer of higher hydrophilicity then the rubbery latex and a non-ionic surfactant consisting of an addition product of ethylene oxide; and European Patent Application 87-409,293 published Dec. 16, 1987, discloses agglomerating rubbery latex by the addition of a polymer and a surfactant wherein the surfactant is multi-sequenced polymer having a polyoxyethylene content ranging from 5 to 95 percent. These processes, however, have typically focused on utilization of a non-ionic surfactant in the form of a polymer or a copolymer involving polyethylene oxide.

SUMMARY OF THE INVENTION

The process of the present invention involves utilization of a non-surfactant, high molecular weight poly(oxy ethylene) bound polymer formed by radical copolymerization of an unsaturated monomer with a vinyl functional high molecular weight polyoxyethylene to form an agglomerating latex of random copolymer, and then adding the agglomerating latex to a latex to be agglomerated, followed by agitation of the mixture at a temperature above the glass transition temperature of the polymer present in the latex to be agglomerated to form agglomerated particles. The resultant agglomerated particles achieve the desired large size and particle distribution at low levels of agglomerating agent while utilizing relatively small particle sizes in the latex to be agglomerated.

DETAILED DESCRIPTION OF THE INVENTION

The agglomerating latex is obtained by reacting a vinyl functional high molecular weight polyoxyethylene in the presence of one or more unsaturated monomers. The preferred unsaturated monomers are ethylenically unsaturated water-insoluble monomers such as styrene, alpha-methylstyrene, acrylonitrile, butyl acrylate, methylmethacrylate, 2-ethylhexyl acrylate butadiene and isoprene. The more preferred unsaturated monomers are esters of acrylic acid and methacrylic acid. The most preferred unsaturated monomer is butyl acrylate. A seed particle may be used to control particle size of the agglomerating particles. A polymeric seed latex made from one or more of the above ethylenically unsaturated monomers, is preferably a poly(butylacrylate) seed latex wherein the $D_w$ (weight average diameter) of the seeds are between 50 nanometers and 200 nanometers, more preferably between 75 nanometers and 150 nanometers, and most preferably between 100 nanometers and 120 nanometers. The polyoxyethylene polymer differs from prior polyoxyethylene agglomerating materials in that it is a high molecular weight homopolymer which does not function as a surfactant, and more particularly has a number average molecular weight of between 1,500 and 50,000, more preferably between 2,000 and 10,000, and most preferably between 3,500 and 7,000. Additionally, the polyoxyethylene is end capped with a vinyl functional monomer, such as methylmethacrylate. Utilizing the seed in combination with the ethylenically unsaturated monomer and the vinyl functional high molecular weight polyoxyethylene permits the formation of agglomerating particles which are in the form of elastomeric particles having bound thereon high molecular weight polyoxyethylene homopolymer, rather than being a simple surfactant block copolymer employing low molecular weight polyoxyethylene materials. Additionally, utilization of the high molecular weight polyoxyethylene in the particle bound form permits the utilization of relatively small amounts of the polyoxyethylene. As set out above, the agglomerating latex is formed by reacting the vinyl functional seed, with the ethylenically unsaturated monomer (such as butylacrylate), and with the vinyl end capped high molecular weight polyoxyethylene (such as poly(ethylene glycol) monomethacrylate) in the presence of large amounts of water and optionally in the presence of small amounts of additives such as sodium monosulphate, disodium isodecyl sulfosuccinate, sodium persulfate and sodium metabisulfite, to facilitate the formation of the particles of the agglomerating latex. The reaction preferably takes place at an elevated temperature of, for example, 65° C. and at a reduced pH, for example, 4. The polyoxyethylene bound particles preferably comprise from 0.5 to 10 percent by weight polyoxyethylene based on the total weight of the agglomerating particles, more preferably from 1 to 3.5 percent by weight thereof, most preferably from 2 to 3 percent by weight thereof; preferably and optionally comprise the seed at a level of from 0.5 to 20 percent by weight based on the total weight of the agglomerating particles, more preferably from 0.7 to 10 percent by weight based on the total weight of the agglomerating particles, and most preferably between 0.9 and 2 percent by weight based on the total weight of the agglomerating particles; preferably comprise the ethylenically unsaturated monomer at a level of from 75 to 99 percent by weight based on the total weight of the agglomerating particles, more preferably from 85 to 98 percent by weight thereof, and most preferably from 89 to 97 percent by weight thereof. As mentioned above, the ethylenically unsaturated monomer, the vinyl functional high molecular weight polyoxyethylene, and the seed combine/react to form the agglomerating particles having the high molecular weight polyoxyethylene bound therein. Also as previously mentioned, the high molecular weight polyoxyethylenes are not considered to be of a surfactant nature, in that the polyoxyethylene is essentially a large hydrophilic material, compared to block copolymers thereof. As previously mentioned, the present process is able to effectively provide agglomeration of rubbery latexes with the utilization of relatively small amounts of polyoxyethylene. The physical mixture of vinyl functional monomer and the seed latex does not function as agglomerating latex. The agglomerating latexes obtained have agglomerating particle sizes of preferably between 50 nanometers and 500 nanometers, more preferably between 250 nanometers and 450 nanometers, and most preferably between 330 nanometers and 435 nanometers. The agglomerating particles obtained have a narrow particle size, which is particularly desirable in the formation of uniform product, more specifically has a weight average diameter to number average diameter ratio of from 1.0 to 2.0, more preferably from 1.01 to 1.07, most preferably from 1.02 to 1.03. With monomodal agglomerating latexes having a restricted size distribution of the particles there are obtained bimodal agglomerated latexes, while with polymodal agglomerating latexes or suitable mixtures of monomomdal agglomerating latexes there are obtained agglomerated latexes with a wide and controlled distribution of the particle size.

The resultant agglomerating latex has the agglomerating particles in water, and the resultant agglomerating latex can then be added to the elastomeric latex in order to obtain the desired agglomerated rubber particle sizes. The amount of the agglomerating particles utilized as a weight percent of the rubber particles being agglomerated is preferably between 0.5 to 10 parts by weight based on 100 parts by weight of the particles being agglomerated, more preferably between 1 part by weight and 5 parts by weight per 100 parts by weight of particles being agglomerated, and most preferably between 2 parts by weight and 4 parts by weight based on 100 parts by weight of particle being agglomerated. Preferably the particles (the particles to be agglomerated) of the elastomeric latex are polymeric diene particles or polymeric alkyl acrylate particle, more specifically are particles of polybutyl acrylate, polybutadiene, copolymers of butadiene with styrene and/or with acrylonitrile and more preferably homo and copolymers of butadiene. Suitable diolefins also include isoprene.

The particle size of the elastomeric particles of the elastomeric latex (the latex to be agglomerated) are preferably small particles in that small particles typically require the least amount of reaction time to produce, and are preferably of a particle size of between 15 nanometers and 200 nanometers, preferably between 75 nanometers and 150 nanometers and most preferably between 80 nanometers and 120 nanometers on average diameter by weight basis. The agglomeration process preferably takes place at a temperature above the glass transition temperature of the elastomeric materials, and more specifically preferably takes place at a temperature of between 50° C. and 75° C.

The resultant agglomerated particles typically have bimodal particle size distributions with the agglomerated larger particles having a weight average diameter (as typically measured by capillary hydrodynamic fractionation) of between 150 nanometers and 700 nanometers, more preferably between 300 nanometers and 600 nanometers, most preferably between 325 nanometers and 550 nanometers. The percent of the elastomeric particles which are agglomerated is typically between 10 and 30 percent by weight based on the total weight of the elastomeric particles, more typically between 11 and 25 percent by weight thereof, and most typically between 12 and 20 percent by weight thereof.

The agglomerated particles may be then utilized as the rubber substrate for acrylonitrile-butadiene-styrene graft copolymers. Vinyl aromatic monomers and ethylenically unsaturated nitrile monomers, and/or alkyl methacrylate monomers may be reacted with the (agglomerated and unagglomerated) rubber particle to form a graft copolymer. Suitable graft copolymers include, for example, acrylonitrile-butylacrylate-styrene, acrylonitrile-butadiene-styrene graft copolymer and methylmethacrylate-butadiene-styrene graft copolymers. The graft copolymers may be used as impact modifiers for thermoplastic resins such as vinyl aromatic polymers and copolymers and alkylmethacrylate polymers and copolymers.

EXAMPLES

The preparation and use of our invention is illustrated by the following examples:

A narrow particle size distribution, poly(butyl acrylate) "seed" latex is prepared at $D_w=110$ nm by polymerizing butyl acrylate in the presence of sodium lauryl sulfate and disodium isodecyl sulfosuccinate as surfactants, and sodium persulfate (SPS) and sodium metabisulfite (SMBS) as initiators at a pH ~4 and 65° C. This "seed" latex is used in the recipes below.

| Recipes for Agglomerating Agents | | | |
|---|---|---|---|
| Agglomerant → | A | B | C |
| Ingredient/Parts by Weight | | | |
| "Seed: | 9.925 | 4.963 | 1.985 |
| Water | 300.537 | → | → |
| Butyl Acrylate | 90.075 | 95.037 | 98.015 |
| SMBS | 0.0532 | → | → |
| SPS | 0.0939 | → | → |
| PEG 200 MM | 2.6 | → | → |
| Particle Size (CHDF-1000; Matec) | | | |
| Dw (nm) | 224.6 | 259.5 | 341.5 |
| Dw/Dn | 1.07 | 1.03 | 1.03 |
| Agglomerant → | D | E | F | G |
| Ingredient/Parts by weight | | | | |
| "Seed" | 1.1 | 1 | 0.9 | 1.985 |
| Water | 300.537 | → | → | → |
| Butyl Acrylate | 98.9 | 99 | 99.1 | 98.015 |
| SMBS | 0.0532 | → | → | → |
| SPS | 0.0939 | → | → | → |
| PEG 200 MM | 2.6 | → | → | → |
| Particle Size (CHDF-1000; Matec) | | | | |
| Dw (nm) | 413.5 | 433.9 | 448.8 | 346.6 |
| Dw/Dn | 1.03 | 1.03 | 1.03 | 1.02 |

PEG 200 MM is a poly(ethylene glycol) monomethacrylate 200 Dalton (Poly Sciences, Inc.). The reactions were carried out for three hours at 65° C. The particle sizes of the resulting agglomerating lattices are given.

Agglomeration Results

The agglomerating agents are added in small quantities to polybutadiene latices of particle diameters of $D_w=90$ nm (CHDF-1000), as illustrated by the examples below:

| Agglomerating Agent | Amount Used (as % of PBD) | $D_w$ of Agg'd Peak (nm)[a] | Percent Agglomerate[b] |
|---|---|---|---|
| A | 3 | 325 | 20 |
| C | 3 | 510 | 12 |
| D | 3 | 763 | 12 |
| E | 3 | 805 | 10 |
| F | 3 | 833 | 8 |
| G | 3 | 673 | 15 |
| H* | 3 | | |

*H is a physical mixture of A and vinyl functional monomer (PEG 200MMA) at 3/0.7 ratio based on 100 parts of rubber.
[a]Bimodal particle size distributions were obtained. The size quoted is for the larger particle peak only.
[b]The percent of the polybutadiene (by weight) which has been agglomerated to the larger size.

The agglomeration agent of G was used to agglomerate a polybutyl acrylate having a particle size of $D_w=82.1$ and used at a 3% level yielded $D_w$ of Agg'd peak 370(nm), percent agglomerated 10%.

We claim:

1. A process for agglomerating latexes of rubbery polymers comprising:

(A) formation of an agglomerating latex by radical copolymerization of (a) an ethylenically unsaturated monomer, and (b) a vinyl functional non-surfactant polyoxyethylene; said copolymerization taking place in the presence of water, said copolymerization resulting in the formation of polyoxyethylene bound agglomerating particles; and (B) admixing said agglomerating particles with a latex of rubbery particles having an average particle size of 15 nanometers to 200 nanometers in diameter on a weight average basis, to form agglomerated particles.

2. The process of claim 1 wherein said rubbery particles are selected from polybutadiene particles and comonomers of butadiene particles.

3. The process of claim 1 wherein said polyoxyethylene has a number average molecular weight of between 1,500 and 50,000.

4. The process of claim 1 wherein said agglomerating particles comprise from 75 percent by weight to 99 percent by weight butylacrylate, and from 0.5 to 10 percent by weight polyoxyethylene based on the total weight of said agglomerating particles.

5. The process of claim 1 wherein said agglomerating particles have a ratio of weight average diameter to number average diameter of between 1.0 and 2.0.

6. The process of claim 1 wherein said process consists essentially of said copolymerization and said agglomeration.

7. The process of claim 1 wherein said process consists of said copolymerization and said agglomeration.

8. The process of claim 1 wherein said polyoxyethylene has a number average molecular weight of between 2,000 and 10,000.

9. The process of claim 1 wherein said vinyl functional moieties of said polyoxyethylene are derived from methylmethacrylate monomer.

10. The process of claim 1 wherein the copolymerization of step (A) further contains a polymeric seed particle.

11. The process of claim 3 wherein said vinyl functional polyoxyethylene is the condensation product of

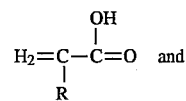

and

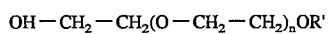

wherein R and R' are independently hydrogen or a $C_1$–$C_4$ alkyl group and n is from 50 to 200.

* * * * *